Figure 1:
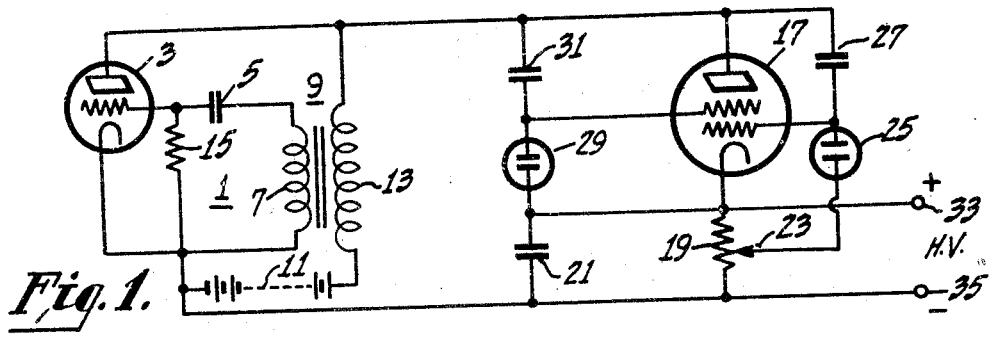

Feb. 3, 1948.    G. C. SZIKLAI ET AL    2,435,414
VOLTAGE REGULATED RECTIFIER CIRCUIT
Filed Feb. 24, 1944

Inventors
GEORGE C. SZIKLAI
& ROBERT R. THALNER
BY
Attorney

Patented Feb. 3, 1948

2,435,414

UNITED STATES PATENT OFFICE 2,435,414

VOLTAGE REGULATED RECTIFIER CIRCUIT

George C. Sziklai and Robert R. Thalner, Princeton, N. J., assignors to Radio Corporation of America, a corporation of Delaware Application February 24, 1944, Serial No. 523,732

10 Claims. (Cl. 175—363)

This invention relates generally to voltage regulated electrical control apparatus and more particularly to improved voltage regulated rectifying circuits to provide operating voltages for electronic apparatus.

The invention contemplates the use of a tetrode or pentode thermionic discharge tube biased to provide substantially constant anode-cathode current characteristics, wherein said tube is employed as a voltage regulating rectifier device for a source of pulsating or alternating potentials. A portion of the rectified voltage derived from the tube is applied degeneratively to the control electrode thereof to compensate for output voltage variations.

Several embodiments of the invention, to be described in detail hereinafter, disclose its application and advantages in combination with various types of electronic apparatus. One of the principal fields in which the invention is particularly advantageous concerns power supply circuits for providing relatively high voltages at relatively low current to cathode ray or other electronic apparatus.

A first embodiment of the invention contemplates the use of a tetrode or pentode thermionic tube having substantially stable bias voltages applied to the control electrode and screen electrode thereof, and having the pulsed output potentials of a blocking oscillator applied across the anode-cathode circuit of the rectifier tube through a tube cathode resistor. A portion of the rectified voltage developed across the cathode resistor is degeneratively applied to the rectifier tube control electrode to compensate for output voltage instability. A relatively high output voltage at relatively low curent may be derived from across the cathode resistor. The control electrode and screen electrode biasing voltages also are derived from the pulsed voltages generated by the blocking oscillator, whereby the control electrode and screen are biased synchronously with the application of positive pulses to the rectifier tube anode. The output voltage derived from across the rectifier tube cathode resistor will be proportional to the algebraic sum of the oscillations provided by the blocking oscillator and the anode energizing potential of said oscillator.

A second embodiment of the invention is similar to said first embodiment with the exception that the driving voltage source comprises a pulse generator circuit of the type customarily employed for providing saw-tooth deflecting potentials for cathode ray tube apparatus.

A third and preferred embodiment of the invention employs a voltage regulating rectifier tetrode or pentode thermionic tube shunt-connected across the output of a pulse generator of either of the types described heretofore. Biasing potentials for the screen and control electrodes of the rectifier tube are derived from the generator anode potential source which preferably is of the constant voltage type such as a battery. A portion of the rectified output voltage, derived from a voltage divider connected across the rectifier tube anode-cathode electrodes, is applied degeneratively to the rectifier tube control electrode to regulate the rectified output voltage. Relatively high load potentials at relatively low current may be derived from the voltage divider.

It should be understood, however, that the various voltage pulse sources illustrated and explained in conjunction with applicants' novel voltage regulating rectifier circuits are included purely for the purpose of illustration, and that the invention may be employed with any known type of alternating or fluctuating potential source.

Among the objects of the invention are to provide an improved method of and means for rectifying and regulating alternating potentials. Another object of the invention is to provide an improved method of and means for employing the substantially constant current characteristics of a multi-electrode thermionic tube for rectifying and regulating potentials derived from an alternating or fluctuating voltage source. An additional object of the invention is to provide an improved thermionic rectifier tube circuit wherein a portion of the rectified votlage is applied degeneratively to said rectifier tube to compensate for load voltage variations. An additional object of the invention is to provide an improved thermionic tube rectifier circuit wherein said rectifier tube is serially interposed between a source of alternating potentials and a load, and wherein a portion of the load voltage is applied degeneratively to said rectifier tube to compensate for load voltage variations. A further object of the invention is to provide an improved thermionic rectifier tube network wherein a substantially constant current multi-electrode thermionic tube is shunt-connected across a line connecting a source of alternating potential to a load device, and wherein a portion of the load voltage is applied degeneratively to one of the rectifier tube control electrodes to compensate for load voltage variations.

Figure 2:
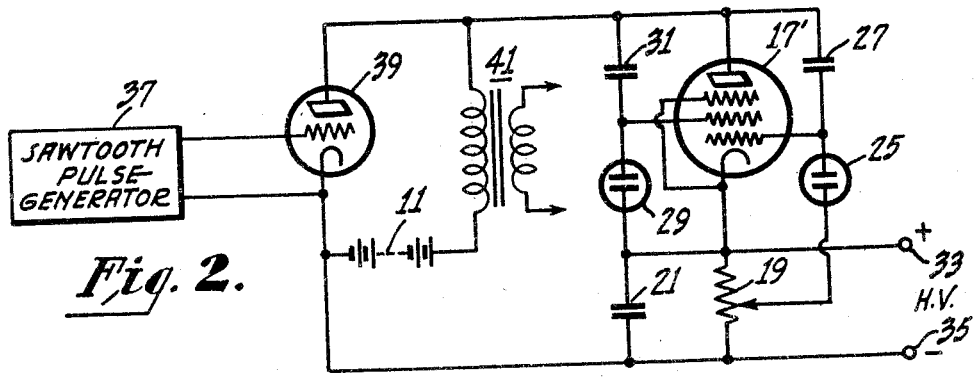
Figure 3:
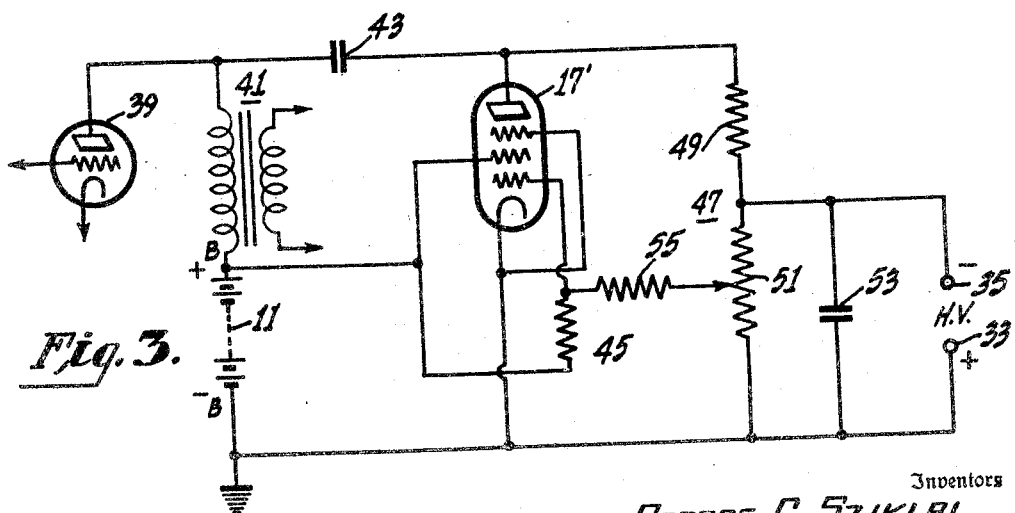

The invention will be described in greater detail by reference to the accompanying drawing of which Figure 1 is a schematic circuit diagram of one embodiment thereof, Figure 2 is a schematic circuit diagram of a second embodiment thereof, and Figure 3 is a schematic circuit diagram of a third and preferred embodiment thereof. Similar reference characters are applied to similar elements throughout the drawing.

Referring to Figure 1, a blocking oscillator 1 includes a triode thermionic discharge tube 3 having its control electrode connected, through a grid capacitor 5 and a primary winding 7 of a transformer 9 to the tube cathode electrode, and to the negative terminal of an anode direct voltage source such, for example, as a battery 11. A grid leak resistor 15 is connected between the control electrode and the cathode of the tube 3. The positive terminal of the anode battery 11 is connected through a secondary winding 13 of the transformer 9 to the anode of the oscillator tube 3.

In operation, as anode current commences to flow through the secondary winding 13 of the transformer 9, it induces currents in the transformer primary winding 7 which increase rapidly the negative bias voltage applied to the tube control electrode until the anode current is cut off. The duration of the pulses thus generated depends upon the inductance and distributed capacitances of the transformer 9, and the pulse repetition rate is determined by the values of the grid capacitor 5 and the grid leak 15.

The short duration, relatively high voltage pulses generated by the blocking oscillator circuit 1 are applied to a tetrode or pentode thermionic rectifier tube 17, the anode of which is connected to the anode of the oscillator tube 3, and the cathode of which is connected through a tapped cathode resistor 19 to the cathode of the oscillator tube 3. A storage capacitor 21 is connected in parallel with the cathode resistor 19. An adjustable tap 23 on the cathode resistor 19 is connected, through a first gaseous spaced electrode glow discharge regulator lamp 25, to the control electrode of the rectifier tube 17. The control electrode of the rectifier tube 17 also is connected through a first capacitor 27 to the anode of the tube.

Similarly, the screen electrode of the rectifier tube 17 is connected through a second gaseous glow discharge regulator lamp 29 to the tube cathode, and through a second capacitor 31 to the anode of the rectifier tube.

In operation, the high magnitude voltage pulses derived from the blocking oscillator circuit 1 are applied effectively between the anode of the rectifier tube and the cathode resistor terminal remote from the cathode electrode. Synchronously therewith, reference bias voltage pulses are applied to the screen electrode and to the control electrode through the second capacitor 31 and second gaseous discharge lamp 29, and through the first capacitor 27 and first gaseous discharge tube 25, respectively. The bias voltage upon the control electrode of the rectifier tube 17 may be varied by adjusting the movable tap 23 on the cathode resistor 19. A load such, for example, as an electronic device, not shown, may be connected to the output terminals 33, 35 which are connected across the parallel-connected cathode resistor 19 and storage capacitor 21.

As the output voltage across the terminals 33, 35 tends to increase, the negative bias voltage applied to the control electrode of the series-connected rectifier tube 17 is increased, thereby reducing the current through the tube and hence reducing correspondingly the rectified voltage across the output terminals 33, 35. Since the circuit compensates quite rapidly for load voltage variations, the effective output voltage across the output terminals remains substantially constant. It should be understood that the additional regulation provided by the degenerative connection between the cathode resistor 19 and the control electrode of the rectifier tube 17 supplements the inherent constant anode-to-cathode current characteristics of a tetrode or pentode thermionic tube having controlled bias voltages on the control electrode and screen electrodes thereof.

Figure 2 is similar to the circuit of Figure 1 with the exception that the high voltage pulse source comprises a conventional saw-tooth pulse generator 37 connected through a triode amplifier tube 39 to a transformer 41 of the type customarily employed for coupling to the deflection elements of the cathode ray oscilloscope, not shown. In addition, the rectifier tube 17' is illustrated as a pentode having its suppressor electrode connected to its cathode but otherwise connected as described in the circuit of Figure 1. In the circuits described in both Figures 1 and 2, the voltage of the anode battery 11 is effectively algebraically added to the rectified voltage derived from the pulse generator insofar as the output voltage across the output terminals 33, 35 is concerned. In both circuits the storage capacitor 21 provides effective filtering of the rectified voltage pulses occurring across the cathode resistor 19, thereby providing effective smoothing of the output voltages across the output terminals.

Figure 3 shows a preferred embodiment of the invention wherein a pulse source, for example, of the type described in the circuit of Figure 2, is coupled through a blocking capacitor 43 to the anode of a pentode thermionic rectifier tube 17'. The cathode of the pentode rectifier tube 17' is connected directly to the negative terminal of the anode battery 11 which provides anode voltage for the amplifier tube 39. The positive terminal of the anode battery 11 is connected directly to the screen electrode of the pentode rectifier tube 17' and also is connected, through a high resistor 45, to the rectifier tube control electrode. Since the substantially constant voltage anode battery 11 is connected to provide reference bias voltages for the control electrode and screen electrode of the rectifier tube, the bias regulating gas discharge lamps 25, 29 and associated capacitors 27, 31, shown in the circuits of Figures 1 and 2, may be omitted. The suppressor electrode of the pentode rectifier tube 17' is connected to the cathode thereof. Rectified output voltage is applied to the end terminals of a voltage divider 47 comprising serially-connected first and second resistors 49, 51, respectively. The output terminals 33, 35 are shunted by a storage capacitor 53, and are connected across the terminals of the second resistor 51 of the voltage divider 47. An adjustable tap on the second resistor 51 of the voltage divider 47 is connected, through a second high resistor 55, to the control electrode of the rectifier tube.

The circuit of Figure 3 therefore includes a pentode rectifier tube shunt-connected with the load and the high voltage pulse source, as distinguished from the circuits of Figures 1 and 2 which employ series-connected rectifier tubes.

As the voltage across the output terminals 33, 35 tends to increase, an increased positive bias is applied to the control electrode of the pentode rectifier tube 17, thereby lowering the voltage between the cathode and anode thereof, and hence lowering correspondingly the rectified output voltages across the output terminals. As in the circuits of Figures 1 and 2, the inherently constant anode-to-cathode current characteristics of the pentode rectifier tube due to the stabilized control electrode and screen electrode bias voltages, is supplemented by the additional degenerative effect of the connection, through the second high resistor 55, from the voltage divider to the rectifier tube control electrode.

In the circuit of Figure 3, the output voltage across the output terminals 33, 35, depends primarily upon the magnitude of the rectified pulse voltages, since the anode battery 11 is connected only to the control electrodes and screen electrodes of the rectifier tube and therefore the voltage thereof is not added to the rectified pulse voltages. The storage capacitor 53 effectively filters the rectified voltage across the output terminals.

Thus the invention described comprises several embodiments of a voltage regulating thermionic rectifier circuit particularly adapted to the rectification and regulation of relatively high voltage, low current energy for use with electronic apparatus. The inherently constant anode-to-cathode current characteristics of tetrodes or pentodes, having controlled grid and screen voltages, is utilized to provide rectifier circuits which include additional voltage regulation due to a degenerative connection from the rectified voltage output circuit to the rectifier tube control electrode.

We claim as our invention:

1. Voltage regulating rectifier apparatus for a source of alternating potential comprising a thermionic tube having at least an anode, a cathode, a screen electrode and a control electrode, means for applying said alternating potentials between said anode and said cathode, a source of substantially stable predetermined bias potentials, means for applying said bias potentials to said screen and to said control electrodes to provide substantially constant anode-cathode current characteristics, means for deriving rectified potentials from said tube, and means for applying at least a portion of said rectified potentials to said control electrode to stabilize said derived voltage.

2. Voltage regulating rectifier apparatus for a source of alternating potential comprising a thermionic tube having at least an anode, a cathode, a screen electrode and a control electrode, means for applying said alternating potentials between said anode and said cathode, a source of substantially stable predetermined bias potentials, means for applying said bias potentials to said screen and to said control electrodes to provide substantially constant anode-cathode current characteristics, means for deriving rectified potentials from said tube, and degenerative means for applying at least a portion of said rectified potentials to said control electrode to stabilize said derived voltage.

3. Voltage regulating rectifier apparatus for a source of alternating potential comprising a thermionic tube having at least an anode, a cathode, a screen electrode and a control electrode, means for applying said alternating potentials between said anode and said cathode, a source of substantially stable predetermined bias potentials, means for applying said bias potentials to said screen and to said control electrode to provide substantially constant anode-cathode current characteristics, means for deriving rectified potentials from said tube, and adjustable means for applying at least a portion of said rectified potentials to said control electrode to stabilize said derived voltage.

4. Voltage regulating rectifier apparatus for a source of alternating potential comprising a thermionic tube having at least an anode, a cathode, a screen electrode and a control electrode, means for applying said alternating potentials between said anode and said cathode, a source of substantially stable predetermined bias potentials, means for applying said bias potentials to said screen and to said control electrodes to provide substantially constant anode-cathode current characteristics, means for deriving rectified potentials from said tube, means for filtering said rectified potentials, and means for applying at least a portion of said rectified potentials to said control electrode to stabilize said derived voltage.

5. Voltage regulating rectifier apparatus for a source of alternating potential comprising a thermionic tube having at least an anode, a cathode, a screen electrode and a control electrode, a cathode series resistor, means for applying said alternating potentials through said resistor between said anode and said cathode, a source of substantially stable predetermined bias potentials, means for applying said bias potentials to said screen and to said control electrodes to provide substantially constant anode-cathode current characteristics, means for deriving rectified potentials from said cathode resistor, and means for applying at least a portion of said rectified potentials to said control electrode to stabilize said derived voltage.

6. Apparatus of the type described in claim 5 characterized in that said bias potential source includes a pair of capacitors interconnecting respectively said screen and said control electrodes with said anode.

7. Voltage regulating rectifier apparatus for a source of alternating potential comprising a thermionic tube having at least an anode, a cathode, a screen electrode and a control electrode, a cathode series resistor, means for applying said alternating potentials through said resistor between said anode and said cathode, a source of substantially stable predetermined bias potentials, means for applying said bias potentials to said screen and to said control electrodes to provide substantially constant anode-cathode current characteristics, means for deriving rectified potentials from said cathode resistor, and adjustable means for applying at least a portion of said rectified potentials to said control electrode to stabilize said derived voltage.

8. Voltage regulating rectifier apparatus comprising, in combination, a blocking oscillator for generating voltage pulses, a thermionic tube having at least an anode, a cathode, a screen electrode and a control electrode, a cathode series resistor, means for applying said voltage pulses through said resistor between said anode and said cathode, a source of substantially stable predetermined bias potentials, means for applying said bias potentials to said screen and to said control electrodes to provide substantially constant anode-cathode current characteristics, means for deriving rectified potentials from said cathode resistor, and means for applying at least a portion of said rectified potentials to said control electrode to stabilize said derived voltage.

9. Voltage regulating rectifier apparatus for a source of fluctuating potential comprising a thermionic tube having at least an anode, a cathode, a screen electrode and a control electrode, a cathode series resistor, means for applying said fluctuating potentials through said resistor between said anode and said cathode, a source of substantially stable predetermined bias potentials, means for applying said bias potentials to said screen and to said control electrodes to provide substantially constant anode-cathode current characteristics, means for deriving rectified potentials from said cathode resistor, and means for applying at least a portion of said rectified potentials to said control electrode to stabilize said derived voltage.

10. Voltage regulating rectifier apparatus for a source of fluctuating potential comprising a thermionic tube having at least an anode, a cathode, a screen electrode and a control electrode, said anode and said cathode being shunt-connected to said source, a source of substantially stable predetermined bias potentials, means for applying said bias potentials to said screen and to said control electrodes to provide substantially constant anode-cathode current characteristics, a voltage divider connected in shunt with said source and said tube for deriving rectified potentials from said tube, and means connected to said voltage divider for applying at least a portion of said rectified potentials to said control electrode to stabilize said derived voltage.

GEORGE C. SZIKLAI.
ROBERT R. THALNER.

REFERENCES CITED

The following references are of record in the file of this patent:

UNITED STATES PATENTS

| Number | Name | Date |
|---|---|---|
| 2,195,121 | Moyer | Mar. 26, 1940 |
| 2,239,289 | Goodhue et al. | Apr. 22, 1941 |
| 2,271,738 | Leftwich | Feb. 3, 1942 |